(12) United States Patent
Kollegger et al.

(10) Patent No.: US 9,657,494 B2
(45) Date of Patent: May 23, 2017

(54) METHOD FOR PRODUCING A TOWER CONSTRUCTION FROM REINFORCED CONCRETE

(71) Applicant: TECHNISCHE UNIVERSITÄT WIEN, Vienna (AT)

(72) Inventors: Johann Kollegger, Klosterneuberg (AT); Maria Charlotte Schönweger, Vienna (AT)

(73) Assignee: TECHNISCHE UNIVERSITÄT WIEN, Vienna (AT)

( * ) Notice: Subject to any disclaimer, the term of this patent is extended or adjusted under 35 U.S.C. 154(b) by 0 days.

(21) Appl. No.: 14/438,662

(22) PCT Filed: Oct. 28, 2013

(86) PCT No.: PCT/EP2013/072472
§ 371 (c)(1),
(2) Date: Apr. 27, 2015

(87) PCT Pub. No.: WO2014/067884
PCT Pub. Date: May 8, 2014

(65) Prior Publication Data
US 2015/0292229 A1    Oct. 15, 2015

(30) Foreign Application Priority Data
Oct. 30, 2012   (AT) .............................. A 50480/2012

(51) Int. Cl.
*E04H 12/00*    (2006.01)
*E04H 12/34*    (2006.01)
(Continued)

(52) U.S. Cl.
CPC ............ *E04H 12/341* (2013.01); *E04B 1/166* (2013.01); *E04B 1/167* (2013.01); *E04H 12/12* (2013.01);
(Continued)

(58) Field of Classification Search
None
See application file for complete search history.

(56) References Cited

U.S. PATENT DOCUMENTS 3,958,381 A * 5/1976 Meyer ..................... E04H 12/12
52/1
4,166,347 A * 9/1979 Pohlman ................... E04C 3/34
52/223.4
(Continued)

FOREIGN PATENT DOCUMENTS

DE         4023465      2/1992
DE        19943082      2/2001
(Continued)

OTHER PUBLICATIONS

IPRP cited in PCT Application No. PCT/EP2013/072472 dated May 5, 2015.

*Primary Examiner* — Joshua J Michener
*Assistant Examiner* — Kyle Walraed-Sullivan
(74) *Attorney, Agent, or Firm* — Workman Nydegger

(57) ABSTRACT

The invention relates to a method for producing a tower construction (1) from reinforced concrete. A tower has at least one cavity (35) that extends in the longitudinal direction within the tower. Double-wall elements (2) are arranged along a periphery of the tower, each comprising an external plate (3) as well as an internal plate (4) in vertical or inclined position, forming vertical external joints (5) as well as vertical internal joints (6) between the external plates (3) and the internal plates (4). A reinforcement (9) is installed in the area of the vertical external joints (5) in-between the external plates (3) as well as the vertical internal joints (6) in-between the internal plates (4). The vertical external joints (5) and the vertical internal joints (6) in-between the
(Continued)

Figure 1:
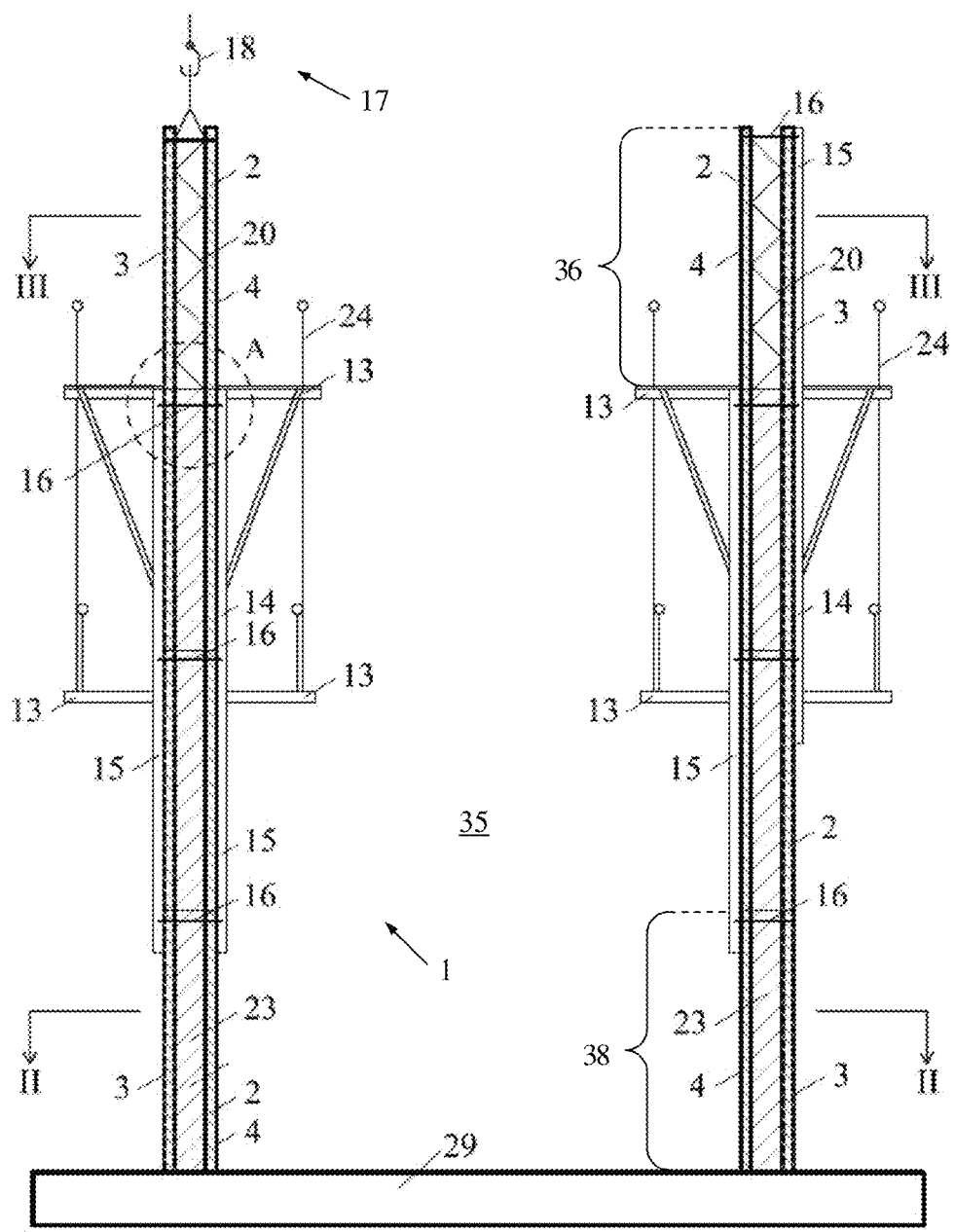

double-wall elements (2) are closed and the double-wall elements (2) are filled with concrete (23).

22 Claims, 11 Drawing Sheets

(51) Int. Cl.
 *F03D 11/04* (2006.01)
 *E04B 1/16* (2006.01)
 *E04H 12/12* (2006.01)
 *F03D 13/20* (2016.01)

(52) U.S. Cl.
 CPC ........... *E04H 12/342* (2013.01); *F03D 13/20* (2016.05); *Y02E 10/728* (2013.01)

(56) References Cited

U.S. PATENT DOCUMENTS

| | | | | |
|---|---|---|---|---|
| 4,242,851 | A * | 1/1981 | Pohlman | E04H 12/12 52/742.14 |
| 5,038,540 | A | 8/1991 | Krautz | |
| 6,938,392 | B2 * | 9/2005 | Fouad | E04H 12/12 52/223.4 |
| 7,426,807 | B2 * | 9/2008 | Cadwell | E04H 12/02 52/834 |
| 7,866,121 | B2 * | 1/2011 | Polyzois | B29C 70/30 343/890 |
| 2005/0166521 | A1 * | 8/2005 | Silber | E04H 12/10 52/633 |
| 2008/0040983 | A1 * | 2/2008 | Fernandez Gomez | E04H 12/12 52/40 |
| 2009/0021019 | A1 * | 1/2009 | Thomsen | E04H 12/085 290/55 |
| 2009/0102743 | A1 * | 4/2009 | Hager | H01Q 1/1242 343/890 |
| 2009/0266004 | A1 * | 10/2009 | Willey | B29C 70/086 52/40 |
| 2010/0135821 | A1 * | 6/2010 | Bagepalli | E04H 12/08 416/244 R |
| 2011/0061332 | A1 * | 3/2011 | Hettick | B29C 70/30 52/651.07 |
| 2011/0131899 | A1 * | 6/2011 | Voss | E02D 27/42 52/173.1 |
| 2012/0042585 | A1 * | 2/2012 | Ericsson | E04H 12/16 52/173.1 |
| 2012/0174522 | A1 * | 7/2012 | Gregor | E04H 12/06 52/651.01 |
| 2012/0210668 | A1 * | 8/2012 | Kryger | E04H 7/22 52/645 |
| 2014/0059964 | A1 * | 3/2014 | Johnston | E04H 12/085 52/514 |
| 2014/0157715 | A1 * | 6/2014 | Wagner | E04H 12/12 52/651.07 |

FOREIGN PATENT DOCUMENTS

| | | |
|---|---|---|
| DE | 202010000169 | 5/2010 |
| EP | 1227204 | 7/2002 |
| EP | 1876316 | 1/2008 |
| EP | 1889988 | 2/2008 |
| WO | WO2005098160 | 10/2005 |
| WO | WO2009121581 | 10/2009 |

* cited by examiner

METHOD FOR PRODUCING A TOWER CONSTRUCTION FROM REINFORCED CONCRETE

The invention relates to a method for producing tower constructions from reinforced concrete having the features of the preamble of claim 1 as well as tower constructions produced according to this method.

In the production of tower constructions from reinforced concrete there is known from prior art the use of climbing formwork, slip forming or the use of large-scale prefabricated parts having grouting joints or dry joints, which are over-compressed by pretension that is applied by means of approximately vertically arranged tendons.

Climbing formwork and slip forming are frequently used for producing tower constructions from reinforced concrete. The disadvantage of these two methods is that the formwork is supported on the construction section last concreted, and this is why production speed is dependent on the hardening process of the concrete.

From the document DE 4023465 A1, e.g., there is known a tower construction made in composite concrete production, wherein slip forming or climbing formwork are described for the production of tower constructions made from cast-in-place concrete as being expensive and complicated in handling. For this reason, there is proposed therein, due to static reasons, the provision of several supports running through the entire tower height, which at least in part engage with the area of the core layer of the cast-in-place concrete and remain connected with the erected tower construction as static beams.

Fast construction progress is possible, if large-scale prefabricated parts made from reinforced concrete are used for producing the tower construction. The disadvantage in building with large-scale prefabricated parts lies in the numerous horizontal joints in the tower construction. Additional vertical joints are necessary if the dimensions of the tower construction in a horizontal section become so large that it is no longer possible to transport the segments in one piece. Huge ring segments, hence, have to be cut into halves or thirds due to transport reasons.

Forming the joints represents additional effort. Vertical joints may be closed by means of joint inserts and a screw connection. Horizontal joints are frequently sealed and over-compressed using a grouting mass and a pre-tension acting in the longitudinal direction of the tower construction. The disadvantage thereof is that the mounting progress depends on the outside temperatures, as the grouting masses may usually only be processed in a temperature range of +5° C. to +30° C. Alternatively to the arrangement of a grouting mass in the horizontal joints, the top and bottom sides of the prefabricated parts may be processed by grinding or milling and subsequently the prefabricated parts are then mounted exclusively directly one above the other with a dry joint. Mounting with dry joints offers the advantage that outside temperatures need not be taken into account. The additional effort for exact processing of the joints by way of grinding or milling, however, represents a disadvantage. Another disadvantage of the construction with prefabricated parts is that there are not present any reinforcements in the joints in-between the prefabricated parts. In vertical joints, this disadvantage may be compensated by screw connections, this, however, results in additional efforts for the production of steel insert parts for the screw connections. The over-compressing of horizontal joints using pretension causes additional pressure tensions in the concrete, which have negative effects on the stress of the tower construction, resulting in fatigue.

It is, hence, the task of the present invention to provide a method, which enables a faster construction progress than it is the case with construction using cast-in-place concrete by means of climbing formwork or slip forming and which prevents simultaneously the horizontal and vertical joints between construction parts occurring with prefabricated parts construction without continuous reinforcement.

These tasks are solved by the method steps stated in the characterizing part of claims 1. Advantageous developments of the invention are defined in the sub-claims.

In a method according to the invention for producing a tower construction from reinforced steel having at least one cavity extending in the longitudinal direction within the tower construction there are firstly arranged along a periphery of the tower construction double-wall elements, which each comprise an external plate as well as internal plate in vertical or inclined position, forming vertical external joints in-between adjacent external plates as well as vertical internal joints in-between adjacent internal plates, subsequently the double-wall elements are secured against a toppling over thereof in their position arranged next to each other, then in the area of the vertical external joints as well as of the vertical internal joints there is installed a reinforcement, which crosses the vertical joints, and in the area of the horizontal external joints as well as of the horizontal internal joints between the external plates and the internal plates there is installed a reinforcement, which crosses the horizontal joints, the vertical external joints and the vertical internal joints in-between the double-wall elements are then, depending on the embodiment, closed using filling concrete, grouting mortar, silicone or a sealing strip, then a working platform arranged along the periphery of the tower construction is lifted by a construction section height, the double-wall elements are filled using filling concrete and the steps indicated above for producing a construction section having a construction section height, which essentially corresponds to a height of the double-wall elements, are repeated as often as necessary to obtain a desired overall height of the tower construction.

Compared to the known methods for producing tower constructions using prefabricated parts, the method according to the invention has the essential advantage that there are not required any complex, frequently ring-like or curved manufactured steel formworks for the production of the prefabricated parts. The production of any kind of construction part shapes without any additional effort for the production of steel formworks is advantageously possible, as the geometry of the tower construction is controlled by the dimensions of the double-wall elements. Planar double-wall elements, furthermore, are essentially easier to transport than large, bowl-like curved prefabricated parts in circle segment form or circle ring form, respectively. Furthermore, in the production method according to the invention, the lifting capacity of the combined prefabricated parts is lower than with bowl-like curved prefabricated parts.

Furthermore, as an advantage of the production method according to the invention there is to be noted that there is present in the filling concrete in the area of all vertical external joints and vertical internal joints a continuous reinforcement, which is why the strength of the tower construction according to the invention is increased.

A connection with steel-construction-like insert parts in these areas, where the ring-like curved prefabricated parts known from prior art have to be divided or cut into halves or thirds, respectively, due to transport reasons, is, especially advantageously, not required for the erection of a tower construction within the scope of the invention.

The designation of a horizontal or vertical, respectively, position, as it is used in the present application, for example, for internal joints, external joints or the reinforcement, continuously relates to the respective position and arrangement at the already erected, essentially vertical tower construction.

Advantageously, the reinforcement, which crosses the vertical internal joints or the vertical external joints, respectively, is arranged at a crossing angle of 90° to 45° in relation to the vertical building joints. The crossing angle is preferably essentially 90° between the vertical internal joints or the vertical external joints, respectively, and the reinforcement crossing these building joints. In this case, the reinforcement, which crosses the vertical building joints, is arranged essentially horizontally.

Similarly, the reinforcement, which crosses the horizontal internal joints and the horizontal external joints, respectively, is also advantageously arranged at a crossing angle of 90° to 45° in relation to the horizontal building joints. The crossing angle is preferably essentially 90° between the horizontal internal joints or the horizontal external joints, respectively, and the reinforcement crossing these building joints. In this case, the reinforcement, which crosses the horizontal building joints, is arranged essentially vertically.

Figure 14:
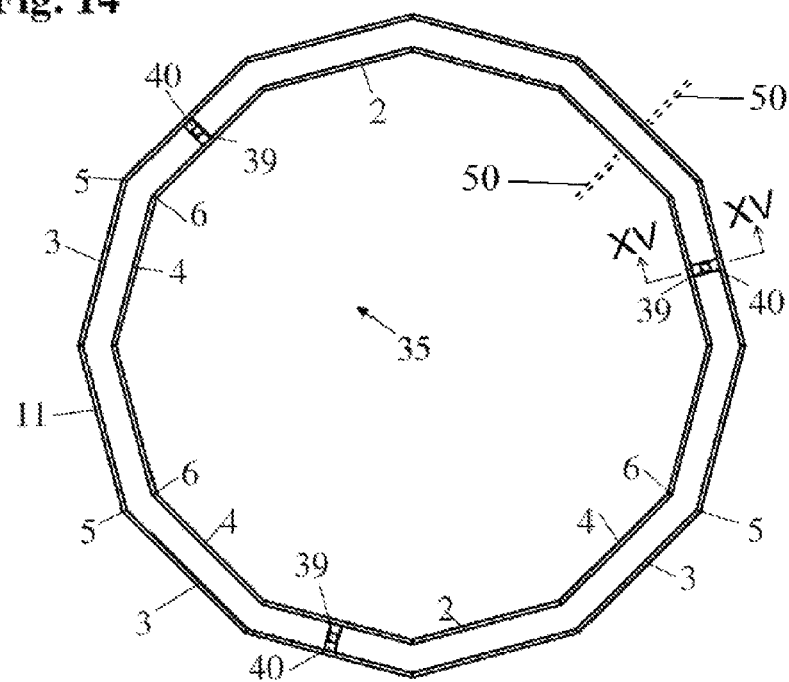

In an especially advantageous method variant for producing a tower construction according to the invention the securing against toppling over of the arranged double-wall elements is performed by
- the double-wall elements being arranged on the ground on a plane pre-mounting site in a vertical or slightly inclined position,
- the double-wall elements being maintained in the arranged position thereof by means of temporary supports (see illustration of temporary supports (50) in FIG. 14),
- the double-wall elements being aligned so that the bottom edges of the external plates as well as of the internal plates are situated in a horizontal plane,
- the double-wall elements being connected with each other into a load-bearing structure in a forcefit way,
- the temporary supports being subsequently removed,
- the load-bearing structure made of doublewall elements connected with each other being lifted,
- the load-bearing structure being lowered onto a periphery of the building section of the tower construction last erected and finally
- being aligned accurately in position.

In comparison with the known methods for producing tower constructions using climbing formwork or slip forming, the proportion of reinforcement works along the height of the tower construction is advantageously decreased in the method according to the invention, as the main part of the reinforcement is arranged in the double-wall elements. When pre-mounting entire load-bearing structures on the pre-mounting site, no reinforcement works are advantageously carried out at a high level, and, hence, the erection works for a tower construction according to the invention are especially safe and comparatively cheap.

In a method according to the invention for producing a tower construction, securing of the double-wall elements against toppling over is usefully realized—upon arrangement on the periphery of the section of the tower construction last erected—by means of attachment to rails of a climbing formwork. In contrast to methods known from prior art, there is no need to wait for the cast-in-place concrete to harden in order to load the attachment elements for the advancing climbing formwork.

In an especially advantageous variant of a method according to the invention for producing a tower construction, the double-wall elements are arranged in a way so that a joint width of the vertical external joints and/or the vertical internal joints in-between adjacent double-wall elements is from 5 mm to 400 mm, preferably from 5 mm to 40 mm.

Advantageously, vertical external joints or internal joints, respectively, having a narrow joint width may be closed especially easily and reliably. Simultaneously, the arrangement according to the invention of double-wall elements into a polygonal, e.g., hexagonal, octagonal or dodecagonal cross-section of the tower construction, offers the advantage that low joint widths are sufficient for tension and expansion compensation in-between adjacent double-wall elements.

In an advantageous development of a method according to the invention for producing a tower construction, the vertical external joints and/or the vertical internal joints are filled using a grouting mortar. As a grouting mortar there are used conventional mortar qualities. If necessary, filling of the vertical external joints and/or the vertical internal joints is realized using formwork elements.

In a production method according to the invention the double-wall elements are usefully arranged in a way so that a joint width of the vertical external joints and/or the vertical internal joints in-between adjacent double-wall elements is closed by means of formwork elements and so that the filling of the vertical external joints and/or the vertical internal joints is carried out simultaneously with the filling of the double-wall elements using filling concrete.

In a production method according to the invention the working platform and the formwork elements for the vertical external joints and/or the vertical internal joints are advantageously mounted on a climbing formwork, and attachment elements for the climbing formwork are arranged in the double-wall elements. In this way, a fast construction progress is especially advantageously possible, as the attachment elements of the climbing formwork are arranged in the double-wall elements. In contrast to methods known form prior art, there is no need to wait for the cast-in-place concrete to harden for loading the attachment elements for the advancing climbing formwork. The loads from the dead weight of the climbing formwork, from the load on working platforms and from wind forces are introduced via the attachment elements into a concrete already hardened of the pre-fabricated double-wall elements.

In a method according to the invention for producing a tower construction the double-wall elements are usefully arranged on a layer of epoxy resin while being mounted on the preceding construction section of the tower construction, and thereby the horizontal external joints in-between external plates arranged one above the other and/or the horizontal internal joints in-between internal plates arranged one above the other are closed by the layer of epoxy resin. Epoxy resin for closing the horizontal joints has the advantage that thereby is used an especially compact joint material having a high elastic modulus and a high tensile strength.

In an especially advantageous variant of a production method according to the invention the double-wall elements are arranged, when being mounted, directly on the preceding construction section of the tower construction, and the horizontal external joints and/or horizontal internal joints are embodied as dry joints.

In another alternative embodiment of a method according to the invention for producing a tower construction the double-wall elements are advantageously arranged, while being mounted, on the preceding construction section of the tower construction on spacers, wherein the horizontal external joints and/or horizontal internal joints are closed using formwork elements and wherein filling horizontal external joints and/or horizontal internal joints is performed using grouting mortar. The spacers have the advantage that any unevenness at the top edges of the double-wall elements or tiny deviations from the horizontal position of the top edges of the double-wall elements already erected in the preceding construction section may be compensated in the ongoing construction section.

In another preferred embodiment variant of a production method according to the invention the double-wall elements, while being mounted on the preceding construction section of the tower construction, are arranged on spacers having a height of 20 mm to 50 mm, and subsequently the horizontal external joints and/or internal joints are closed using formwork elements, and filling of the horizontal external joints and/or internal joints is carried out simultaneously with the filling of the double-wall elements using concrete. In this production variant the spacers are grouted with concrete upon adjustment or compensation, respectively, of level differences between the preceding and the ongoing construction sections in the horizontal internal and/or external joints, and in this way the load of the wall elements situated above is distributed uniformly along the entire cross-section of the construction.

Another variant according to the invention of a method for producing a tower construction is characterized by a sequence of the following mounting steps while mounting the double-wall elements on the pre-mounting site:
  in a first step there are closed only the vertical external joints in-between the external plates, with open vertical internal joints remaining in-between the internal plates,
  in a second step there is installed in the area of the vertical external joints in-between the external plates and the vertical internal joints in-between the internal plates a reinforcement, which crosses the vertical external joints as well as the vertical internal joints,
  the double-wall elements are connected with each other in the area of the vertical external joints and of the vertical internal joints in a force-fit way and
  the vertical internal joints in-between the internal plates are closed by means of formwork elements.

In another alternative of a method according to the invention for producing a tower construction, while mounting the double-wall elements on the pre-mounting site, the following mounting steps are advantageously followed:
  in a first step only the vertical internal joints in-between the internal plates are closed, with open vertical external joints in-between the external plates remaining,
  in a second step there is installed in the area of the vertical external joints in-between the external plates and the vertical internal joints in-between the internal plates, respectively, a reinforcement, which crosses the vertical external joints as well as the vertical internal joints,
  the double-wall elements are connected with each other in the area of the vertical external joints and the vertical internal joints in a force-fit way and
  the vertical external joints in-between the external plates are closed using formwork elements.

In another variant of the production method according to the invention, while mounting the double-wall elements on the preceding construction section, a sequence of the following mounting steps is to be usefully observed:
  in a first step only the external plates are supported on the bottom edges thereof on the preceding construction section respectively across the horizontal external joint, with an open horizontal internal joint remaining between the internal plates and the preceding construction section,
  an inspection of the support of the double-wall elements along the periphery is performed via the open horizontal internal joint,
  any additionally required sealing measures for the horizontal external joint are performed and
  the horizontal internal joint is closed using formwork elements.

In another preferred method variant for producing a tower construction, while mounting the double-wall elements on the preceding construction section, the following mounting steps are to be followed:
  in a first step only the internal plates are supported on the bottom edges thereof on the preceding construction section respectively across the horizontal internal joint, with an open horizontal external joint remaining between the external plates and the preceding construction section,
  an inspection of the support of the double-wall elements along the periphery is performed via the open horizontal external joint,
  any additionally required sealing measures for the horizontal internal joint are performed and
  the horizontal external joint is closed using formwork elements.

Advantageously, according to a further method variant according to the invention for producing a tower construction, the horizontal external joints and/or the horizontal internal joints of the double-wall elements combined into a load-bearing structure on the pre-mounting side are processed by grinding, milling or height compensation using grouting mortar in a way so that essentially all the points of the upper and lower horizontal external joints and/or the upper and lower horizontal internal joints are situated in two horizontal planes having a constant distance of a construction section height to each other. In this embodiment the horizontal external joints and/or the internal joints of the combined double-wall elements are each post-processed in order to obtain an essentially uniform course of the horizontal joints and in order to compensate any possible unevenness in the horizontal joint course of the double-wall elements. A next load-bearing structure of the subsequent construction section, hence, may be put down especially easily and fittingly onto the level joint course of the top edges of the preceding construction section.

In a method according to the invention for producing a tower construction the external plates of the double-wall elements are advantageously composed of coloured concrete. Thereby, the tower constructions according to the invention may be erected with colour-designed external plates. Within the scope of the invention it is thus conceivable to design individual height sections of the tower construction with coloured double-wall elements in different colours.

In a preferred development of the invention in a method for producing a tower construction, a height of a double-wall element in the mounting state is 2 m to 15 m. In this way, double-wall elements that are combined into a load-bearing structure having a mounting height of, e.g., 13 m may be erected as a construction section of the tower construction, whereby an especially fast building rate is enabled.

The cylinder strength of the concrete in the hardened state thereof may be between 20 MPa and 200 MPa. For the production of double-wall elements there may be suitably used normal-strength concrete having a cylinder strength of 20 MPa to 50 MPa, high-strength concrete having a cylinder strength of 50 MPa to 100 MPa as well as ultrahigh-strength concrete having a cylinder strength of 100 MPa to 200 MPa.

The thicknesses of the external plates and the internal plates of the double-wall elements, for example, are usually between 50 mm and 70 mm. If high-strength or ultrahigh-strength concrete is used, the plate thicknesses may be reduced accordingly.

Figure 2:
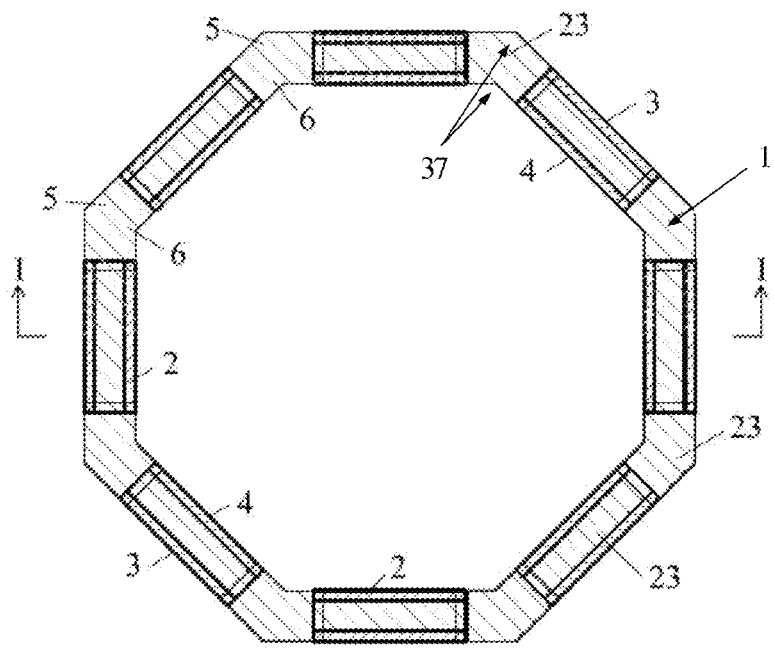
Figure 3:
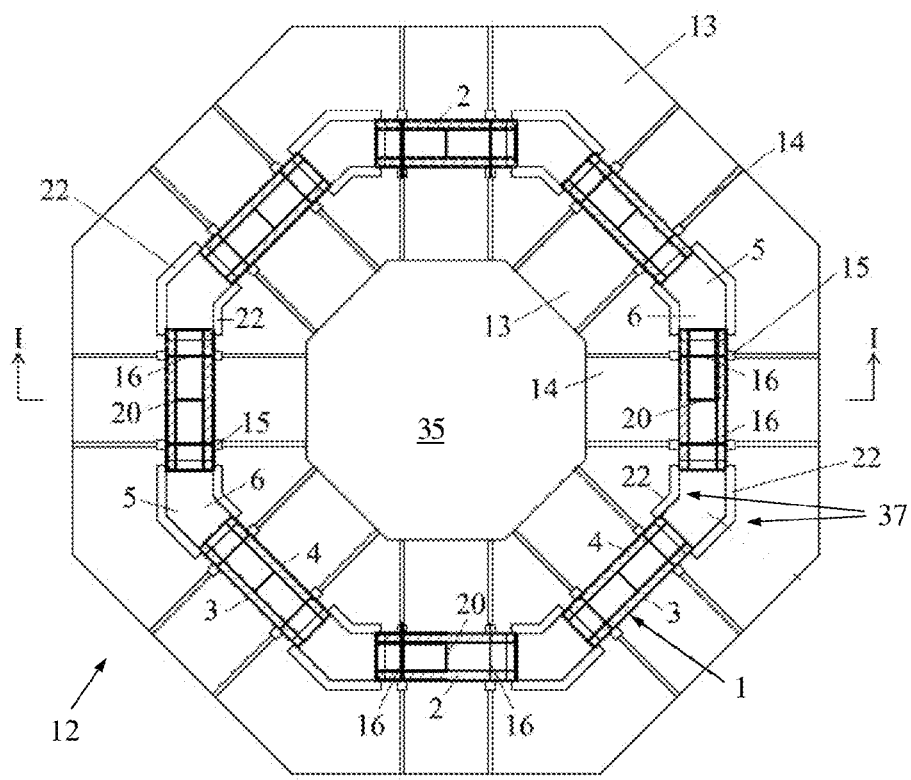
Figure 4:
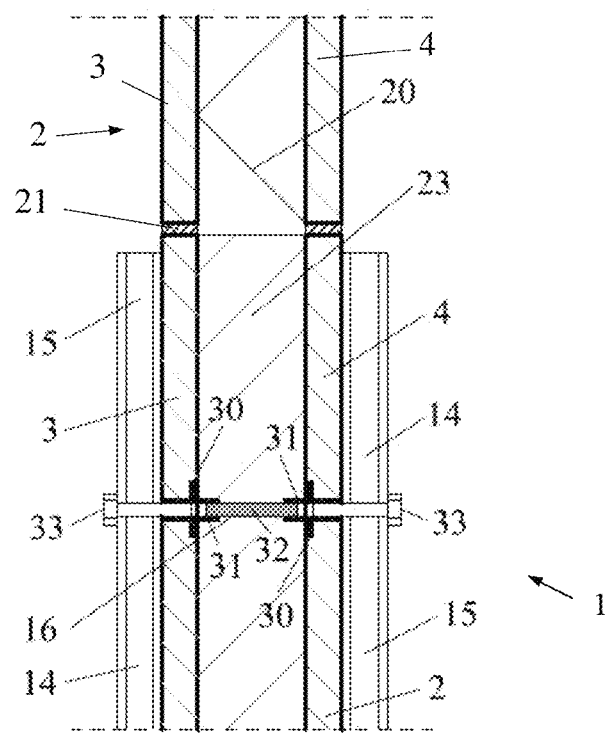
Figure 6:
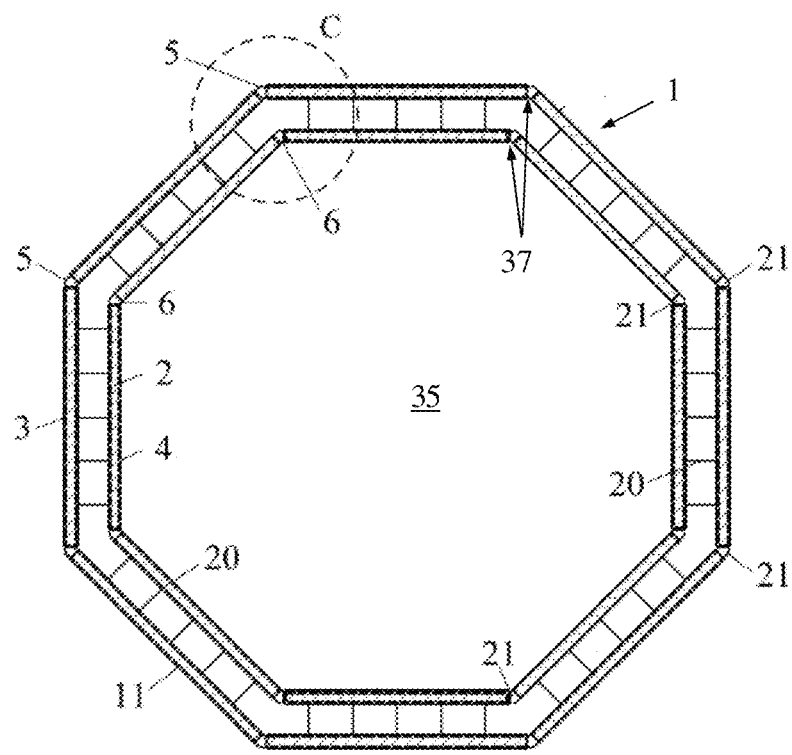
Figure 5:
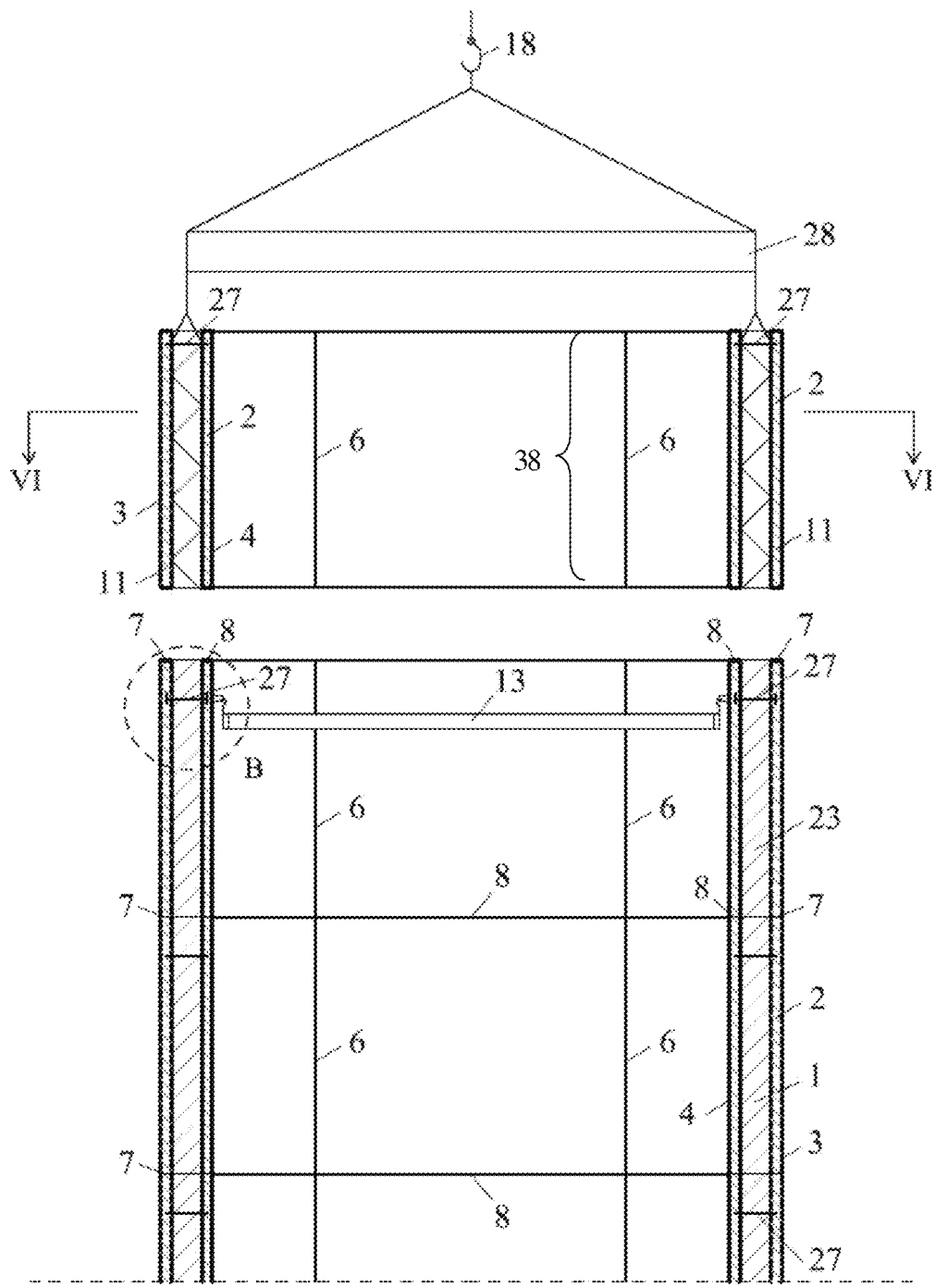
Figure 7:
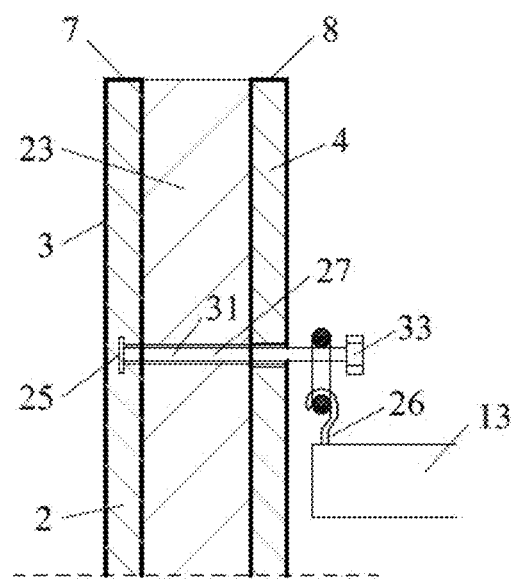
Figure 8:
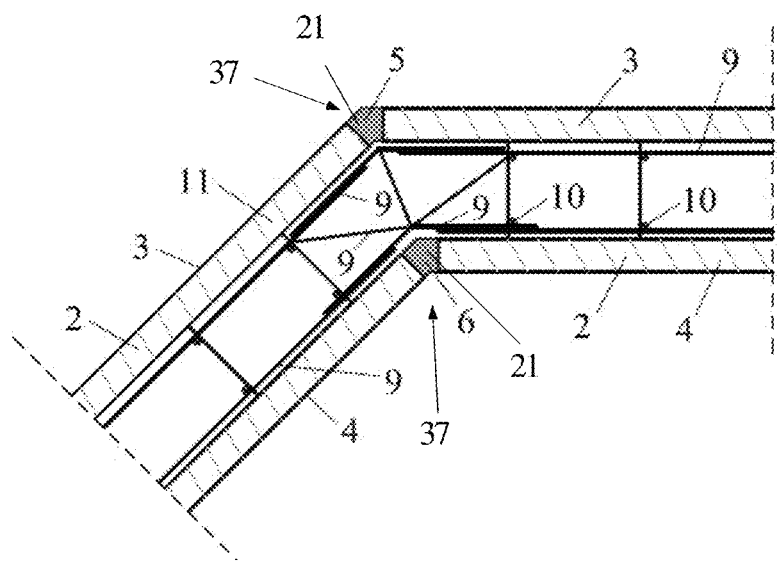
Figure 9:
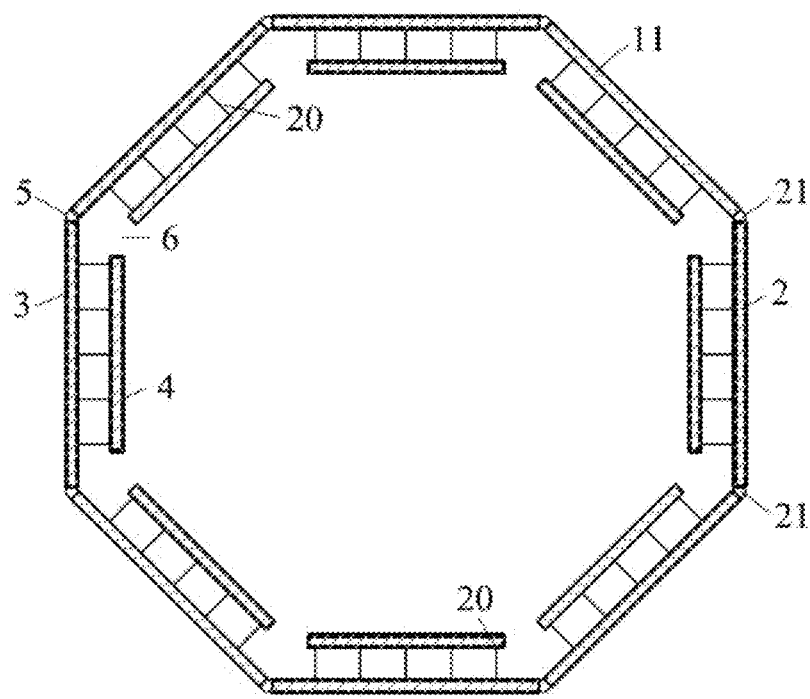
Figure 13:
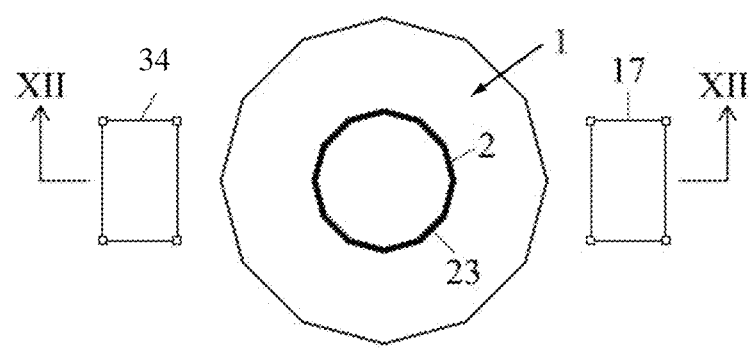
Figure 10:
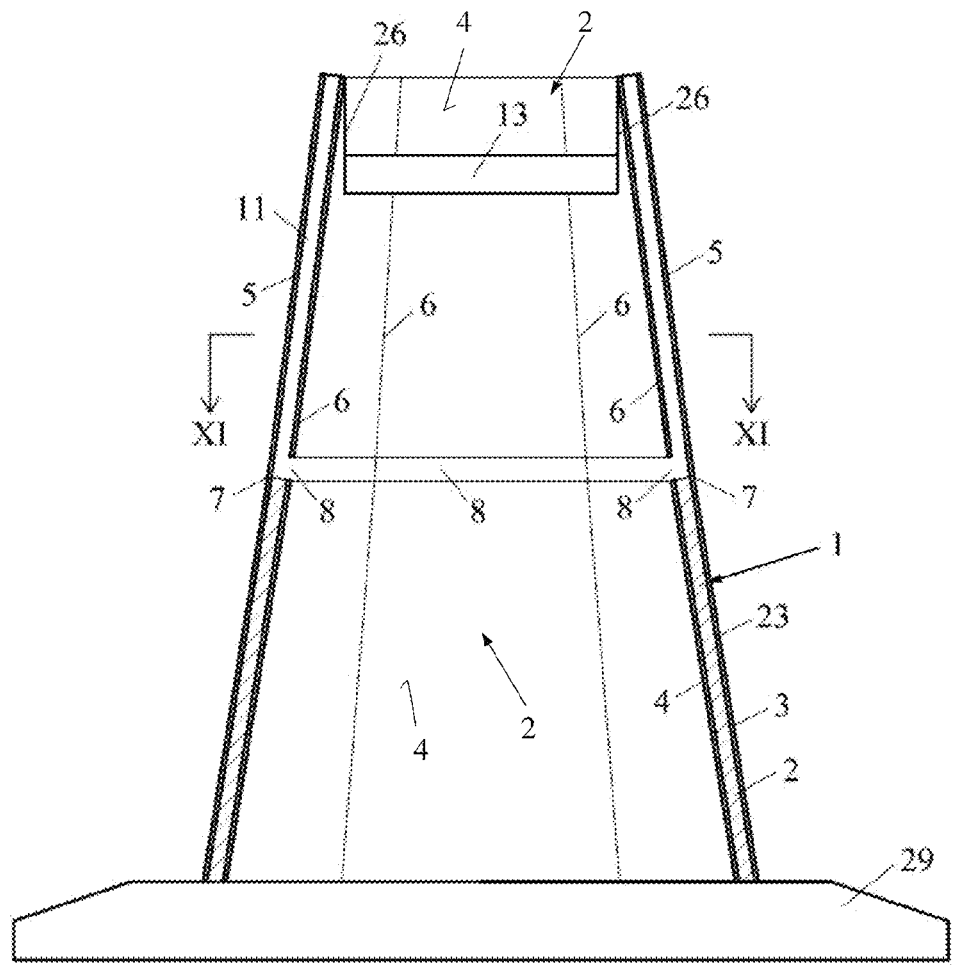
Figure 11:
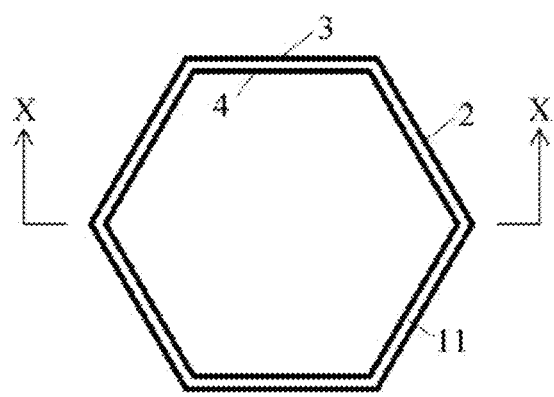
Figure 12:
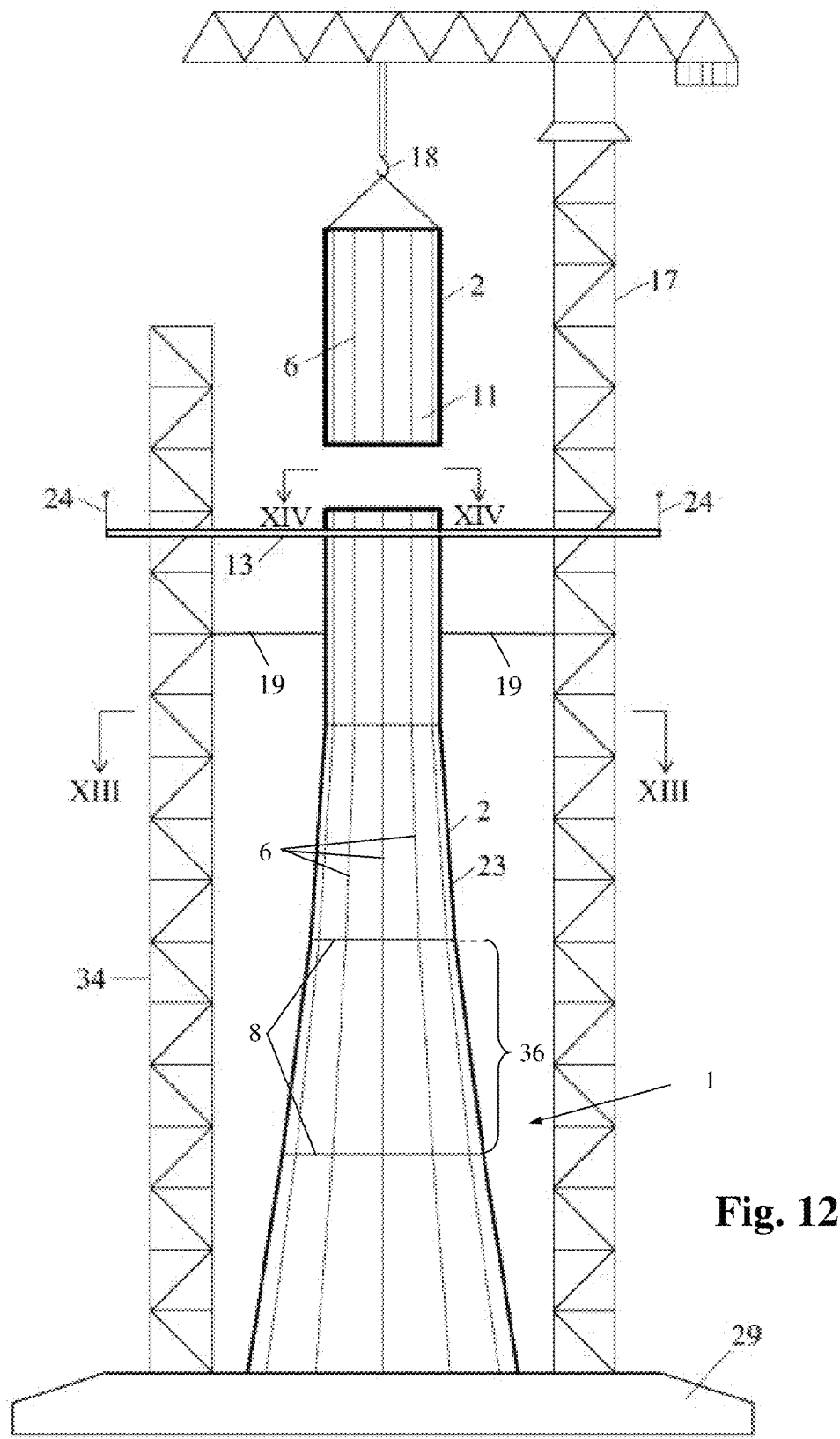
Figure 15:
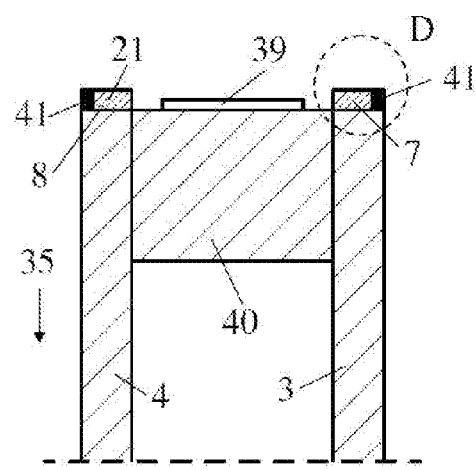
Figure 16:
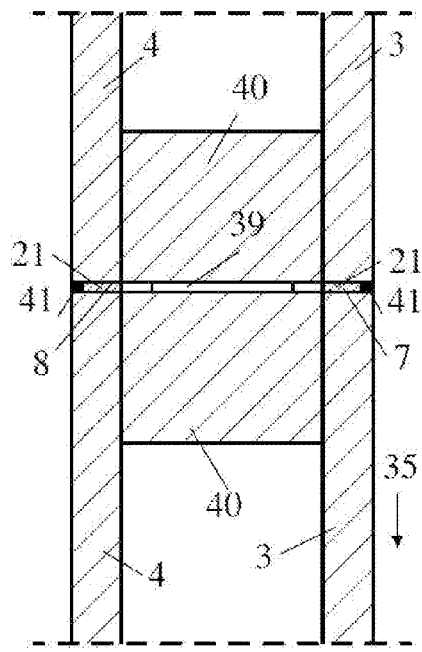
Figure 17:
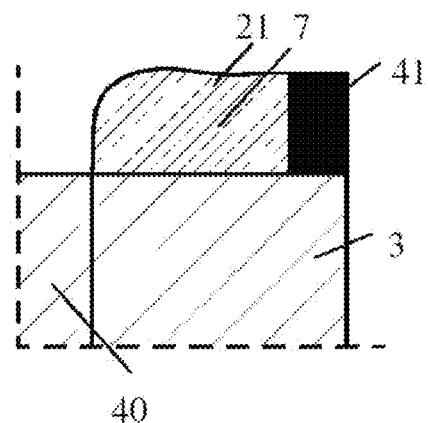
Figure 18:
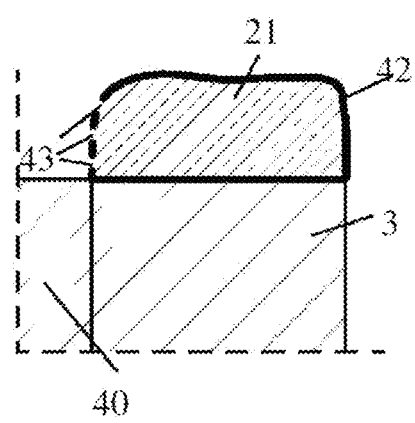
Figure 19:
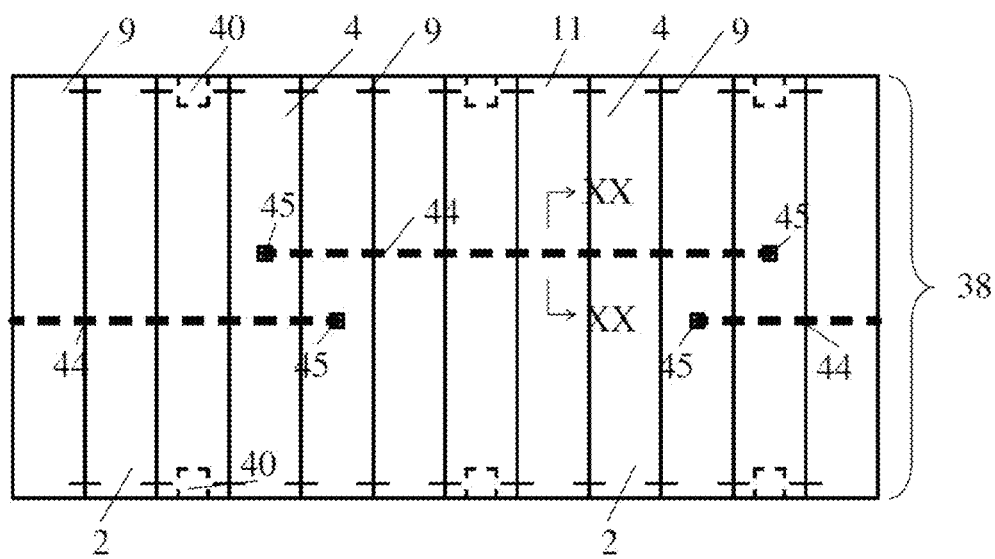
Figure 20:
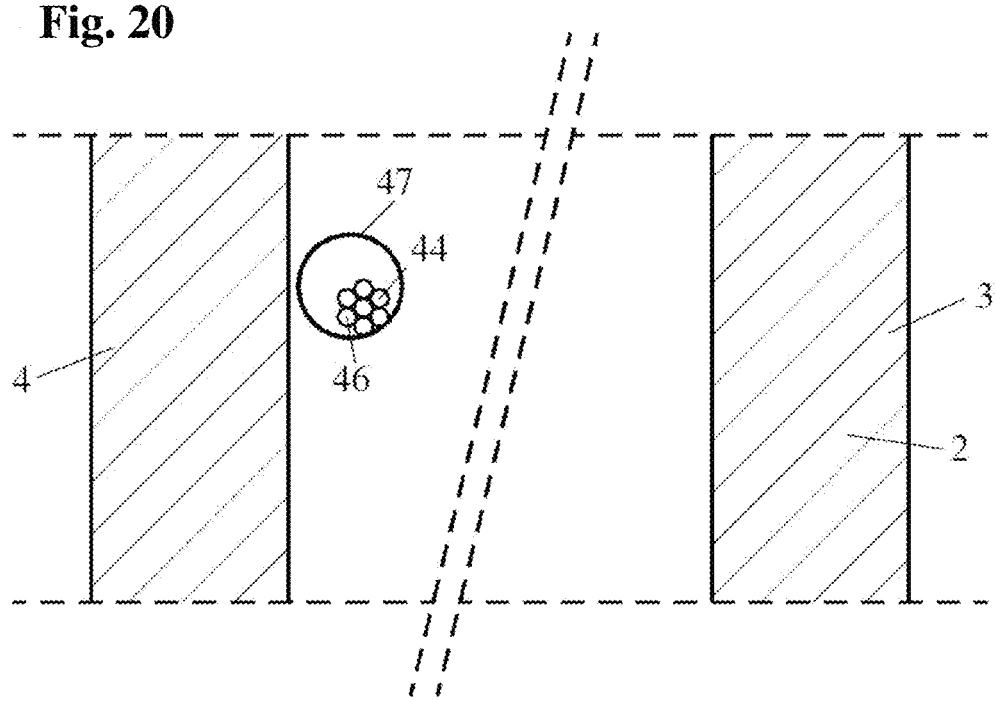
Figure 21:
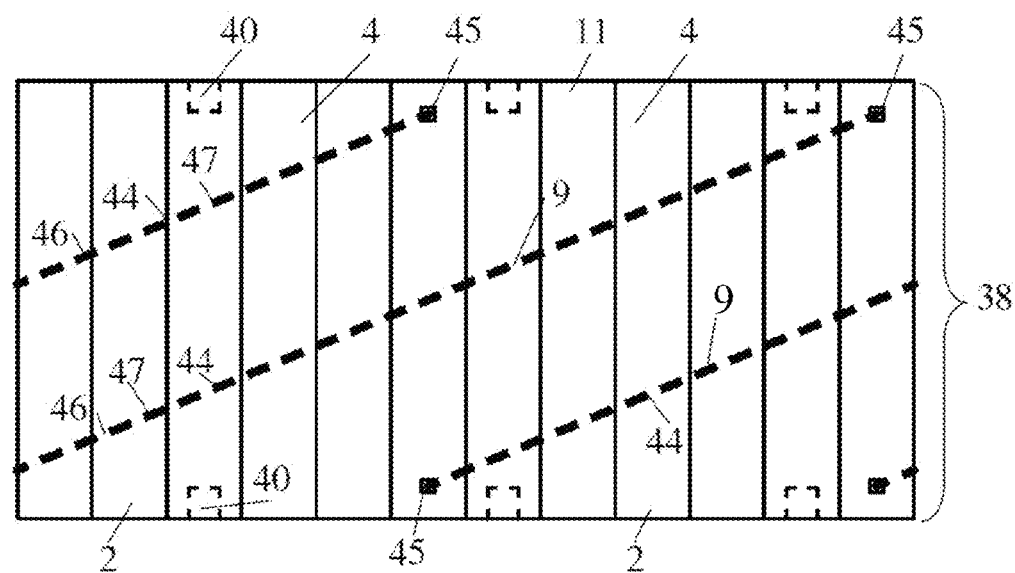

Further details, features and advantages of the invention will become evident from the following description of the embodiment examples schematically depicted in the drawings in FIG. 1 to FIG. 21. In the drawings shows:

FIG. 1 a vertical section of a first embodiment according to the invention of a tower construction according to the section plane I-I indicated respectively in FIG. 2 and FIG. 3 during the production thereof using double-wall elements and climbing formwork;

FIG. 2 a horizontal section of the first embodiment according to the section plane II-II indicated in FIG. 1 after the introduction of the filling concrete;

FIG. 3 a horizontal section of the first embodiment according to the section plane III-III indicated in FIG. 1 during the mounting of the double-wall elements;

FIG. 4 the detail A depicted in FIG. 1;

FIG. 5 a section of a second embodiment according to the invention during the mounting of the double-wall elements connected into a load-bearing structure;

FIG. 6 a horizontal section of the second embodiment according to the section plane VI-IV depicted in FIG. 5 during the crane mounting;

FIG. 7 the detail B of FIG. 5;

FIG. 8 the detail C of FIG. 6;

FIG. 9 a horizontal section corresponding to FIG. 5 and having an altered embodiment of the vertical joint in-between the internal plates;

FIG. 10 a section of a third embodiment according to the invention according to the section plane X-X schematized in FIG. 11;

FIG. 11 a horizontal section of the third embodiment according to the section plane XI-XI indicated in FIG. 10;

FIG. 12 a section of a fourth embodiment according to the invention during crane mounting according to the section plane XII-XII schematized in FIG. 13;

FIG. 13 a horizontal section of the fourth embodiment according to the section plane XIII-XIII indicated in FIG. 12;

FIG. 14 a horizontal section of the fourth embodiment according to the section plane XIV-XIV indicated in FIG. 12;

FIG. 15 a vertical section according to the section plane XV-XV indicated in FIG. 14;

FIG. 16 a vertical section corresponding to FIG. 15 upon the lowering of the load-bearing structure situated above;

FIG. 17 the detail D depicted in FIG. 15;

FIG. 18 a detail corresponding to FIG. 17 and having an altered embodiment of the grouting joint;

FIG. 19 a development of the interior view of the load-bearing structure suspended on the crane hook in FIG. 12;

FIG. 20 a section according to the section plane XX-XX indicated in FIG. 19 in an enlarged scale;

FIG. 21 an interior view corresponding to FIG. 19 of a developed load-bearing structure having an altered embodiment of the reinforcement in the ring direction.

A first embodiment according to the invention of the method according to the invention is depicted in the illustrations FIG. 1 to FIG. 4.

According to FIG. 1, for the production of a construction section of a tower construction 1, double-wall elements 2 are suspended on a crane hook 18 of a crane 17 not depicted herein and lowered onto the preceding construction section. Each double-wall element 2 is composed of an external plate 3 and an internal plate 4, which are each connected with each other by means of intervening lattice girders 20. Before the suspension of a double-wall element 2 from the crane hook 18, the respective double-wall element 2 is to be secured against toppling over. In the upper part of FIG. 1 there is shown how a double-wall element 2 is suspended form a crane hook 18 and a second double-wall element 2 is already secured against unintentional toppling over in the state of construction by means of an attachment to laterally arranged rails 15 of a climbing formwork 14.

The climbing formwork 14 may, for example, be embodied as a self-climbing formwork system. A climbing formwork 14 usually has one or several working platforms 13, which enable the work to be performed for positioning the formwork and for introducing the concrete. The climbing formwork 14 is attached at the preceding construction sections by way of attachment elements 16. The attachment elements 16 are integrated in the double-wall elements 1. This has the advantage that the loads from the dead weight of the climbing formwork 14, from the load on the working platforms 13 and from wind forces are introduced via the attachment elements 16 into the already hardened concrete of the pre-fabricated double-wall elements 2. Construction progress is therefore not affected by the required waiting times for the concrete to harden in the preceding construction section, as it is usually the case with conventional climbing formwork inserts. A construction section height 36 herein essentially corresponds to a building height 38 of a double-wall element 2.

Inside the tower construction 1 a cavity 35 is visible in the sectional view of FIG. 1. A horizontal base plate 29 serves as a foundation of the tower construction 1. On the working platform 13 herein depicted, appropriate anti-fall guards 24 are installed for securing the construction personnel.

In FIG. 2 there is depicted a horizontal section through one of the preceding construction sections of the first embodiment, according to the section plane II-II indicated in FIG. 1, after the introduction of the filling concrete 23. Herein, there are shown, for example, eight double-wall elements 2, which have already been filled between the external plates 3 and the internal plates 4 using filling concrete 23. The adjacent double-wall elements 2 have vertical external joints 5 and vertical internal joints 6, each having a joint width 37, which form an octagonal shape in the horizontal section through the tower construction 1. In FIG. 2 the lattice girder 20 and a reinforcement of the filling concrete 23 between the external plates 3 and the internal plates 4 of the double-wall elements 2 are not shown for reasons of clarity.

In FIG. 3, which shows a horizontal section of the first embodiment according to the section plane III-III indicated in FIG. 1 during the mounting of the double-wall elements 2, the double-wall elements 2 are shown arranged along a periphery 12 of the tower construction 1. As is visible in the sectional view of FIG. 1, one of the double-wall elements 2 is still suspended from the crane hook 18. The remaining double-wall elements 2 are secured against unintentional toppling over by means of the rails 15 of the climbing formwork 14. The external plates 3 and the internal plates 4 are each connected with each other by way of lattice girders 20. The vertical external joints 5 and the vertical internal joints 6 in-between the double-wall elements 2 are each encased by way of formwork elements 22. The working platforms 13 in this example are arranged on the interior and exterior faces of the tower construction 1. The attachment elements 16 for the rails 15 of the climbing formwork 14 are arranged in the double-wall elements 2.

According to FIG. 4, which shows the detail A of FIG. 1 in an enlarged view, an attachment element 16 may, for example, be composed of two sleeves 31, having an internal thread and an anchor rod 32 situated in-between, for the attachment of the rails 15 of the climbing formwork 14 to the tower construction 1. For a better anchoring of the sleeves 31 in the external plate 3 and the internal plate 4, an annular slab 30 may be welded onto the sleeve 31. The sleeves 31 with the annular slab 30 and the anchor rod 32 are already integrated during the production of the double-wall elements 2. In the production process the sleeves 31 are sealed by a plug in order to prevent concrete from entering during the production of the double-wall elements 2. Before the rail 15 is attached by means of a screw 33, this plug has to be removed.

A second embodiment variant of the method according to the invention is depicted in the FIGS. 5 to 9.

For the production of a construction section of the tower construction 1, according to FIG. 5, for example, eight double-wall elements 2 connected with each other, which are combined by this connection into a common loadbearing structure 11, are suspended via a traverse 28 from a crane hook 18 and are together lowered onto the preceding construction section.

Combining several double-wall elements 2 on a pre-mounting site, which is situated near the erection area of the tower construction 1, is advantageous, as many working steps for the production of the tower construction 1 may thus be carried out on the ground, and the number of crane liftings is reduced.

Attachment elements 27 are installed in the double-wall elements 2, engaging into the external plates 3 and the internal plates 4. At these attachment elements 27, there is suspended a working platform 13. In the example of the second embodiment, the working platform 13 is arranged merely on the interior side of the tower construction 1. This gives the advantage that no additional measures for securing the working personnel against falling off have to be realized.

In this example, the horizontal external joints 7 and the horizontal internal joints 8 of each load-bearing structure element 11 have already been pre-processed on the pre-mounting site so that essentially all the points of the horizontal joints 7, 8 at the top edges or bottom edges, respectively, of the eight double-wall elements 2 connected with each other are situated respectively in one plane. In this way, lowering the load-bearing structure element 11 onto the preceding construction section may be performed without the levelling fillers that are usually required in the horizontal joints 7, 8 for the compensation of construction tolerances. By the pre-processing of the plane horizontal external joints 8 and the horizontal internal joints of the respective preceding construction section as well as of the load-bearing structure element 11 currently suspended from the crane hook 18, the individual pre-fabricated construction parts may be joined one above the other in an especially quick and highly precise way. The embodiment of such a construction part joint is designated as dry joint.

FIG. 6 presents a horizontal section through the load-bearing structure element 11 according to the section plane VI-VI indicated in FIG. 5. There is shown that the vertical external joints 5 in-between the external plates 3 and the vertical internal joints 6 in-between the internal plates 4 of the double-wall elements 2 are filled using grouting mortar 21. A reinforcement made from concrete steel is not depicted in FIG. 6 due to reasons of clarity.

In FIG. 7, which shows an enlargement of detail B of FIG. 5, there is depicted another possible embodiment of the attachment elements 27 for attaching a working platform 13. Sleeves having an internal thread 31 are installed in the external plates 3 and the internal plates 4 during the production of the double-wall elements 2 and are then secured by way of an anchor plate 25 against pulling out. The working platform 13 is attached to the attachment element 27 by means of a screw 33 and a suspension 26.

In FIG. 8 there is shown according to detail C of FIG. 6 how two double-wall elements 2 are connected with each other by filling the vertical external joint 5 in-between the external plates 3 as well as the vertical internal joint 6 in-between the internal plates 4 using grouting mortar 21 and by welding the reinforcement 9, which reinforcement 9 crosses the vertical external joint 5 as well as the vertical internal joint 6 and which herein is arranged essentially horizontally. A crossing angle between the horizontal reinforcement 9 and the vertical external joint 5 or the vertical internal joint 6, respectively, herein is essentially 90°. By filling of the vertical joints 5 or 6, respectively, and by welding the herein horizontally arranged reinforcement 9, there is developed a rigid connection, in which tensile forces and compression forces, bending moment and shearing force may be transferred between the double-wall elements 2. A structure of level elements, which are connected with each other along the edges thereof, is designated as load-bearing structure 11. By connecting projections of a reinforcement 10, which reinforcement 10 crosses the horizontal external joint 7 as well as the horizontal internal joint 8 and which is herein arranged essentially vertically, construction sections of the load-bearing structure 11 that may be situated above one another, e.g., also by means of welding, may be additionally connected with each other in an especially rigid way.

An alternative embodiment of a vertical internal joint 6 in-between the internal plates 4 is illustrated in FIG. 9. The mutual distance of the internal plates 4 between two double-wall elements 2 is thus enlarged, so that there are being formed wider vertical internal joints 6. Due to the embodiment of the vertical internal joints 6, which is wider in comparison with FIG. 6, the production of a rigid connection between the individual double-wall elements 2 is simplified. Upon formation of the connection between the individual double-wall elements 2, the vertical internal joint 6 is then either closed by the aid of formwork elements 22, or it is filled using grouting mortar 21. Similarly, filling of the vertical internal joints 6 using grouting mortar 6 may additionally also require the use of formwork elements 22.

A third embodiment according to the invention having inclined double-wall elements 2 is shown in the illustrations of the FIGS. 10 and 11. The inclined embodiment of the walls of the tower construction 1 requires a trapezoidal production of the double-wall elements 2. The working platform 13 is attached to the internal plates 4 of the double-wall elements 2 by means of suspensions 26. In this embodiment, the dead weight of the load-bearing structure 11 is transferred to the preceding construction section merely via the support surface of the external plates 3 in the horizontal external joint 7. The horizontal internal joint 8 in-between the internal plates 4 is embodied having a large joint width in order to enable the inspection of the support of the load-bearing structure 11 across the horizontal external joint Tonto the preceding construction section and, if necessary, to perform additional sealing measures. Before filling of the filling concrete 23, the horizontal internal joint 8 is to be closed using formwork elements 22.

From FIG. 11 there can be seen that this embodiment depicted in FIG. 10, for example, has a hexagonal cross-section.

A fourth embodiment according to the invention of a tower construction 1 having inclined or vertical wall sections is depicted in the illustrations of the FIGS. 12 to 21. Mounting of the load-bearing structures 11 combined by double-wall elements 2 is realized using a crane 17, which is attached to the base 29. The crane 17 and an auxiliary pillar 34 are connected with the tower construction 1 by way of strutting 19. In FIG. 12 there is shown a load-bearing structure 11 that is attached to the crane hook 18 directly by means of pulling cables. The horizontal forces thereby occurring in the upper part of the load-bearing structure 11 have to be taken over by the double-wall elements 2 and the vertical joints 5, 6. Works for filling the horizontal joints 7, 8 and for introducing the filling concrete 23 are in this example performed on a working platform 13 that is situated outside of the tower construction 1. The working platform 13 having anti-fall guards 24 is attached to the crane 17 and to the auxiliary pillar 34, and it is then lifted or lowered, as required, for performing the section-wise production of the tower construction 1.

In FIG. 13 and FIG. 14 there is shown that the fourth embodiment has, for example, a dodecagonal cross-section.

In FIG. 14 there is shown that in this embodiment example there are arranged cross beams 40 in three positions, which each connect the external plates 3 and the internal plates 4 of the double-wall elements 2. Onto the cross beams 40 there are placed spacers 39. The reinforcements 9, 10 and the lattice girder 20 are not depicted in the cross-sectional view of FIG. 14 for reasons of clarity. The arrangement of three cross beams 40 and three spacers 39 is especially advantageous, as by means of three support points there is generated a statically determined position for the load-bearing structure 11 situated above. By measurement of the heights of the top sides of the spacers 39 and by selection of spacers 39 having appropriate thicknesses, hence, three support points may be created in a horizontal plane.

FIG. 15 shows a possible embodiment for the production of the horizontal external joints 7 and the horizontal internal joints 8 of the tower construction 1. On the top side of the external plates 3, there is arranged a sealing profile 41 on the exterior surface of the tower construction 1. On the top side of the internal plates 4 there is arranged a sealing profile 41 on the surface facing the cavity 35. Subsequently, grouting mortar 21 is applied to the top side of the external plates 3 and of the internal plates 4 so that the height of the grouting mortar 21 is higher than the height of the spacers 39.

Upon lowering of the double-wall element 2 situated above, as depicted in FIG. 16, the sealing profiles 41 are compressed, and the excessive grouting mortar 21 will exit into the cavity between the external plates 3 and the internal plates 4. The sealing profiles 41 advantageously prevent the grouting mortar 21 from exiting on the exterior surface of the tower construction 1 and the surface facing the cavity 35.

FIG. 17 shows that the sealing profile 41 and the layer of grouting mortar 21 have approximately the same height or thickness, respectively.

An altered embodiment of the horizontal grouting joints 7, 8 is depicted in FIG. 18. FIG. 18 shows a sealing strip 42 filled with grouting mortar 21. Filling the sealing strip 42 with grouting mortar 21 may, for example, be realized by the sealing strip 42 having a width that corresponds to twice or three times the thickness of the external plate 3, being placed onto the top side of the external plate 3, the grouting mortar being applied and the projecting ends of the sealing strip 42 being wound around the grouting mortar.

FIG. 18 illustrates that the sealing strip 42 has openings 43, through which the excessive grouting mortar 21 may exit when lowering the double-wall element 2 situated above.

FIG. 19 shows the interior view of a development of the load-bearing structure element 11, which is shown suspended from the crane hook 18 in FIG. 12. The arrangement of a reinforcement 9 in the area of the vertical external joints 5 and the vertical internal joints 6 in the cavity between the external plates 3 and the internal plates 4, wherein the reinforcement 9 crosses the vertical external joints 5 or the vertical internal joints 6, respectively, and which is herein arranged essentially horizontally, will guarantee, upon hardening of the filling concrete 23, together with the horizontal reinforcement arranged in the double-wall elements 2, a continuous reinforcement of the tower construction 1 in the ring direction. Arranging the reinforcement 9, which crosses the vertical external joints 5 and the vertical internal joints 6 and which, as shown herein, is arranged at a crossing angle of essentially 90° in relation to the vertical external joints 5 or the vertical internal joints 6, respectively, is easily obtainable on the top side or on the bottom side of the load-bearing structure 11. A possibility of installment of the reinforcement across the entire height 38 of the double-wall element 2 is only possible, if the width of the vertical external joint 5 or the vertical internal joint 6 is formed so large so that it is possible to install the reinforcement 9. A respective embodiment of the vertical internal joint 6 is, for example, shown in FIG. 9.

FIG. 19 shows an especially advantageous embodiment of a reinforcement 9, which crosses the vertical external joints 5 and the vertical internal joints 6. At the upper and lower end of the load-bearing structure 11 there is installed the herein essentially horizontal reinforcement 9 made of rebar concrete steel, as these areas are accessible from above and from below. Approximately in the middle of the height 38 of the double-wall element 2 there are installed two horizontal tendons 44. The tendons 44 in this example have a length that is slightly higher than half of the periphery 12 of the load-bearing structure 11. All double-wall elements 2 are joined into a load-bearing structure 11 by tensioning the two tendons 44. The tendons 44, which are installed in jacket tubes 47, have a tendon anchor 45 on each of the two ends.

In FIG. 20 there is shown in a sectional view an embodiment, in which the tendon 44 is composed of a seven-wire tension wire braid 46 that is arranged in a jacket tube 47. The tendon 44 might also be composed of a tension wire braid 46 surrounded by a plastic sleeve, of several tension wire braids 46 or of a fibre composite material. The tendon 44 is herein in FIG. 20 arranged in the cavity of the double-wall element 2 between the external plates 3 and the internal plates 4.

The jacket tubes 47 and the tendon anchors 45 are advantageously already installed during the production of the double-wall elements 2. After arrangement of the double-wall elements 2 on the pre-mounting site, the vertical external joints 5 and the vertical internal joints 6 may be closed and sealed by tensioning the tendons 44 at the tendon anchors 45. In the case of high production accuracy of the double-wall elements 2, the vertical external joints 5 and the internal joints 6 may be embodied as dry joints. Pressing the double-wall elements 2 together in the vertical external joints 5 and the internal joints 6 causes the individual double-wall elements 2 being combined into a stable load-bearing structure 11.

The jacket tubes each have only a length, which approximately corresponds to the width of the double-wall elements 2. The jacket tubes are to be embodied having a sufficiently large diameter so that introducing the tension wire braids 46 at the kinks in-between the double-wall elements 2, which in the dodecagonal embodiment example according to FIG. 14 each have 30°, works perfectly. A trumpet-like enlargement of the end pieces of the jacket tubes 47, into which the tension wire braid is introduced, may contribute to an easier insertion of the tension wire braids 46. Compressing the jacket tubes 47 after tensioning the tendons 44 is not possible with this embodiment, as a sealing of the jacket tubes at the kinks in-between the double-wall elements 2 cannot be performed. When the filling concrete 23 is introduced, the jacket tubes are partially filled with filling concrete 23. Using filling concrete 23 having a small maximal grain size or additional openings in the jacket tube 47 contribute to a high filling level of the jacket tubes 47 with filling concrete 23.

An alternative embodiment for the arrangement of the reinforcement 9 in the load-bearing structure 11 is shown in FIG. 21. The tendons 44 are produced in an inclined position and extend across the entire length of the periphery 12 of the tower construction 1. The reinforcement 9 here crosses the vertical external joints 5 or the vertical internal joints 6, respectively, in-between the double-wall elements 2 respectively at a crossing angle of, e.g., 70°.

Compared to the well-known methods known for producing tower constructions using climbing formwork or slip forming, the method according to the invention at least has the following advantages:

Faster construction progress is possible, as the attachment elements 16 of the climbing formwork 14 are arranged in the double-wall elements 2. Hence, there is no need to wait for the cast-in-place concrete to harden in order to load the attachment elements 16 for the advancing climbing formwork.

The proportion of reinforcement works along the height of the tower construction 1 is decreased, as the main part of the statically required reinforcement is arranged in the double-wall elements 2. The reinforcements 9 and 10, which are arranged in the filling concrete 23, only account for a comparably small proportion of the overall reinforcement mass. If entire loadbearing structures 11 are pre-mounted on the pre-mounting site, there are advantageously not taking place any reinforcement works at a high level, and, hence, the construction works of a tower construction 1 according to the invention are comparatively safe and cheap.

The proportion of formwork at high levels is lower, which is why the construction costs for a tower construction 1 are reduced.

In comparison with the well-known methods for the production of tower constructions using pre-fabricated parts, the method according to the invention has at least the following advantages:

It is not necessary to produce complex, frequently ring-like or curved steel formworks.

The production of any kind of construction part shapes is possible without any additional effort for the production of steel formwork, as the geometry of the tower construction 1 is controlled by the dimensions of the double-wall elements 2.

There are neither horizontal external joints 7 or horizontal internal joints 8 without these crossing or continuous, respectively, reinforcement 10 nor vertical external joints 5 or vertical internal joints 6 without these crossing or continuous, respectively, reinforcement 9, which is why the rigidity of the tower construction according to the invention is advantageously increased.

The crossing angle of the reinforcement 9, which crosses the vertical external joints 5 or the vertical internal joints 6, respectively, is from 90° to 45° in relation to the vertical joints 5, 6. Preferably, the crossing angle between the vertical external joints 5 or the vertical internal joints 6, respectively, and the reinforcement 9 crossing these joints 5, 6 is essentially 90°. In this case, the reinforcement 9, which crosses the vertical joints 5, 6, is arranged essentially horizontally.

The crossing angle of the reinforcement 10, which crosses the horizontal external joints 7 or the horizontal internal joints 8, respectively, is also from 90° to 45° in relation to the horizontal joints 7, 8. The crossing angle between the horizontal external joints 7 or the horizontal internal joints 8, respectively, and the reinforcement 10 crossing these joints 7, 8 is preferably essentially 90°. In this case, the reinforcement 10, which crosses the horizontal joints 7, 8, is arranged essentially vertically.

There is no need for a complete over-compressing of the horizontal external joints 7 or the horizontal internal joints 8 in the ultimate limit state of the load capacity. This results in a lower pressure load of the concrete and, hence, an improved behaviour in regard to material fatigue.

A connection with steel construction associated mounting parts in these areas, where the ring-like prefabricated parts known from prior art have to be divided or cut into halves or thirds, respectively, is advantageously not required for the erection of a tower construction 1 within the scope of the invention.

The efforts for the production of the horizontal external joints 7 or the horizontal internal joints 8 are reduced.

The transport of the finished parts will be easier since the double-wall elements 2 may be planar construction parts.

The lifting capacity is lower.

In the present description, there is described the embodiment of tower constructions 1 by means of, for example, hexagonal, octagonal and dodecagonal cross-sections. The method according to the invention, however, may also be used for the production of any polygonal cross-sections.

In the present description there is further described the embodiment of the tower construction 1 having double-wall elements 2, which have lattice girders 20. The method according to the invention may, however, also be used with other means of connection for connecting the external plates 3 and the internal plates 4 of the double-wall elements 2, for example by means of corrugated sheet steel or plastic parts.

LIST OF REFERENCE NUMBERS

1 tower construction
2 double-wall element
3 external plate of the double-wall element
4 internal plate of the double-wall element 5 vertical external joint in-between external plates arranged next to each other
6 vertical internal joint in-between internal plates arranged next to each other
7 horizontal external joint in-between external plates arranged one above the other
8 horizontal internal joint in-between internal plates arranged one above the other
9 reinforcement crossing the vertical joints
10 reinforcement, crossing the horizontal joints
11 load-bearing structure
12 periphery of the tower construction
13 working platform
14 climbing formwork
15 rail of the climbing formwork
16 attachment element for the climbing formwork
17 tower crane
18 crane hook
19 strutting between tower construction and crane
20 lattice girder
21 grouting mortar
22 formwork element
23 filling concrete
24 anti-fall guard on the working platform
25 anchor plate
26 suspension, chamfer strip
27 attachment element for working platform
28 traverse
29 base
30 annular slab
31 sleeve having internal thread
32 anchor rod
33 screw
34 auxiliary pillar
35 cavity
36 construction section height
37 joint width of a vertical external joint or internal joint
38 height of the double-wall element
39 spacer
40 cross beam
41 sealing profile
42 sealing strip
43 openings
44 tendon
45 tendon anchor
46 tension wire braid
47 jacket tube

The invention claimed is:

1. A method for producing a tower construction from reinforced concrete having at least one cavity that extends in the longitudinal direction within the tower construction, the method comprising:

arranging, along a periphery of the tower construction, a plurality of prefabricated and planar load-bearing double-wall elements, each comprising an external plate disposed parallel to an internal plate in a vertical or inclined position, forming vertical external joints in-between adjacent external plates as well as vertical internal joints in-between internal plates, securing the double-wall elements against toppling over in position arranged next to each other by means of temporary supports, installing a reinforcement in an area of the vertical external joints as well as the vertical internal joints between the external plates and the internal plates, which crosses the vertical external joints and the vertical internal joints, installing a reinforcement in an area of horizontal external joints as well as horizontal internal joints between the external plates and the internal plates, which crosses the horizontal external joints and the horizontal internal joints, closing the vertical external joints and the vertical internal joints in-between the double-wall elements using filling concrete, grouting mortar, silicone, or a sealing strip, lifting a working platform, arranged along the periphery of the tower construction, by one construction section height, filling the double-wall elements with filling concrete, and repeating, one or more times, the steps for producing a construction section having a construction section height, which substantially corresponds to a height of the double-wall elements.

2. A method for producing a tower construction according to claim 1, wherein the securing of the double-wall elements against toppling over in the state of construction is performed by arranging the double-wall elements on the ground on a pre-mounting site in a vertical or slightly inclined position, wherein the double-wall elements are maintained in the arranged position thereof by means of temporary supports, aligning the double-wall elements so that the bottom edges of the external plates as well as of the internal plates are each situated in a horizontal plane, connecting the double-wall elements with each other into a load-bearing structure in a force-fit way, removing the temporary supports being, lifting the load-bearing structure, which is composed of double-wall elements being connected with each other, lowering the load-bearing structure onto a periphery of the construction section of the tower construction last erected and aligning the load-bearing structure accurately in position.

3. A method for producing a tower construction according to claim 1, wherein the securing of the double-wall elements against toppling over, after the arrangement on the periphery of the section of the tower construction last erected is realized by means of an attachment to rails of a climbing formwork.

4. A method for producing a tower construction according to claim 1, wherein the double-wall elements are arranged so that a joint width of the vertical external joints and/or of the vertical internal joints in-between the adjacent double-wall elements is from 5 mm to 400 mm.

5. A method for producing a tower construction according to claim 4, wherein the vertical external joints and/or the vertical internal joints are filled using a grouting mortar using formwork elements.

6. A method for producing a tower construction according to claim 1, wherein the double-wall elements are arranged so that a joint width of the vertical external joints and/or the vertical internal joints in-between the adjacent double-wall elements is closed by means of formwork elements, and the filling of the vertical external joints and/or of the vertical internal joints is performed simultaneously with the filling of the double-wall elements using filling concrete.

7. A method for producing a tower construction according to claim 5, wherein the working platform and the formwork elements for the vertical external joints and/or the vertical internal joints are mounted on a climbing formwork and that the attachment elements for the climbing formwork are arranged in the double-wall elements.

8. A method for producing a tower construction according to claim 1, wherein the double-wall elements are arranged, when being mounted on a preceding construction section of the tower construction, on a layer of epoxy resin, and wherein horizontal external joints in-between external plates, that are arranged one horizontal external joint above another of the horizontal external joints and/or above horizontal internal joints in-between internal plates that are arranged one horizontal internal joint above another of the horizontal internal joints, are closed by the layer of epoxy resin.

9. A method for producing a tower construction according to claim 1, wherein the double-wall elements, while being mounted, are arranged directly onto a preceding construction section of the tower construction, and wherein horizontal external joints and/or horizontal internal joints are embodied as dry joints.

10. A method for producing a tower construction according to claim 5, wherein the double-wall elements while being mounted on a preceding construction section of the tower construction are arranged on spacers, that the horizontal external joints and/or the horizontal internal joints are closed using formwork elements, and that the filling of the horizontal external joints and/or the horizontal internal joints is realized using grouting mortar.

11. A method for producing a tower construction according to claim 5, wherein the double-wall elements, while being mounted on a preceding construction section of the tower construction, are arranged on spacers having a height of 20 mm to 50 mm, that the horizontal external joints and/or the internal joints are closed using formwork elements, and that filling of the horizontal external joints and/or internal joints is performed simultaneously with the filling of the double-wall elements using concrete.

12. A method for producing a tower construction according to claim 2, wherein while mounting the double-wall elements on the pre-mounting site
in a first step there are closed only the vertical external joints in-between the external plates, with open vertical internal joints remaining in-between the internal plates,
in a second step there is installed in the area of the vertical external joints in-between the external plates and the vertical internal joints in-between the internal plates a reinforcement, which crosses the vertical external joints and the vertical internal joints,
the double-wall elements are connected with each other in the area of the vertical external joints and the vertical internal joints in a force-fit way and
the vertical internal joints in-between the internal plates are closed by means of formwork elements.

13. A method for producing a tower construction according to claim 2, wherein while mounting the double-wall elements on the pre-mounting site
in a first step only the vertical internal joints in-between the internal plates are closed, with open vertical external joints remaining in-between the external plates,
in a second step there is installed in the area of the vertical external joints in-between the external plates and the vertical internal joints in-between the internal plates a reinforcement, which crosses the vertical external joints and the vertical internal joints,
the double-wall elements are connected with each other in the area of the vertical external joints and the vertical internal joints in a force-fit way and
the vertical external joints in-between the external plates are closed using formwork elements.

14. A method for producing a tower construction according to claim 5, wherein while mounting the double-wall elements on a preceding construction section
in a first step only the external plates are supported on the bottom edges thereof on the preceding construction section respectively above the horizontal external joint, with an open horizontal internal joint remaining between the internal plates and the preceding construction section,
an inspection of the support of the double-wall elements along the periphery is performed via the open horizontal internal joint,
any additionally required sealing measures for the horizontal external joint are performed and
the horizontal internal joint is closed using formwork elements.

15. A method for producing a tower construction according to claim 5, wherein while mounting the double-wall elements on a preceding construction section
in a first step only the internal plates are supported on the bottom edges thereof on the preceding construction section respectively above the horizontal internal joint, with an open horizontal external joint remaining between the external plates and the preceding construction section,
an inspection of the support of the double-wall elements along the periphery is performed via the open horizontal external joint,
any additionally required sealing measures for the horizontal internal joint are performed and
the horizontal external joint is closed using formwork elements.

16. A method for producing a tower construction according to claim 2, wherein the horizontal external joints and/or the horizontal internal joints of the double-wall elements that are combined into a load-bearing structure are treated on the pre-mounting site by means of grinding, milling or height compensation using grouting mortar in a way so that substantially all points of the upper and lower horizontal external joints and/or upper and lower horizontal internal joints are situated in two horizontal planes having a constant distance to each other of a construction section height.

17. A method for producing a tower construction according to claim 1, wherein the external plates of the double-wall elements are comprised of coloured concrete.

18. A method for producing a tower construction according to claim 1, wherein a height of a double-wall element has 2 m to 15 m in a mounting state.

19. A method for producing a tower construction according to claim 1, wherein the reinforcement, which crosses the vertical external joints and the vertical internal joints, is installed as tendons in jacket tubes and that the tendons are pre-tensioned at tendon anchors.

20. A method for producing a tower construction according to claim 19, wherein the tendons upon arrangement of the double-wall elements on the pre-mounting site are pre-tensioned in a way so that the vertical external joints and the vertical internal joints are over-compressed and individual double-wall elements are thus combined into a load-bearing structure.

21. A method for producing a tower construction according to claim 1, wherein in horizontal external joints and horizontal internal joints there are installed sealing profiles, wherein the sealing profiles arranged on the external plates are arranged on the exterior face of the tower construction and the sealing profiles arranged on the internal plates are arranged on the side facing the cavity, wherein, while lowering the double-wall elements of a construction site situated above, the sealing profile is compressed.

22. A method for producing a tower construction according to claim 1, wherein in horizontal external joints and horizontal internal joints sealing strips are filled using grouting mortar, wherein the sealing strips have openings and the openings of the sealing strips resting on the external plates and the internal plates are each arranged in a way so that when lowering the double-wall elements situated above, excessive grouting mortar may exit into the cavity between the external plates and the internal plates.

\* \* \* \* \*

UNITED STATES PATENT AND TRADEMARK OFFICE
CERTIFICATE OF CORRECTION

| | | |
|---|---|---|
| PATENT NO. | : 9,657,494 B2 | Page 1 of 1 |
| APPLICATION NO. | : 14/438662 | |
| DATED | : May 23, 2017 | |
| INVENTOR(S) | : Kollegger et al. | |

It is certified that error appears in the above-identified patent and that said Letters Patent is hereby corrected as shown below:

In the Specification

Column 2
Lines 5-6, change "than it is the case" to --than is the case--

Column 4
Lines 47-48, change "known form prior" to --known from prior--

Column 7
Line 21, change "In the drawings shows:" to --The drawings show:--

Column 8
Line 19, change "suspended form" to --suspended from--

Column 9
Line 30, change "depicted in the FIGS." to --depicted in FIGS.--

Column 11
Line 8, change "joint Tonto" to --joint 7 onto--
Line 12, change "From FIG. 11 there can" to --From FIG. 11 it can--
Line 35, change "FIG. 14 there is" to --FIG. 14 it is--
Line 37, change "FIG. 14 there is" to --FIG. 14 it is--

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*